May 7, 1946.  J. A. ROCHÉ  2,399,828
PROPELLER
Filed Oct. 29, 1941  4 Sheets-Sheet 1

INVENTOR
JEAN A. ROCHÉ
BY Richard Van Buren
HIS ATTORNEY

May 7, 1946. J. A. ROCHÉ 2,399,828
PROPELLER
Filed Oct. 29, 1941 4 Sheets-Sheet 2

INVENTOR
JEAN A. ROCHÉ
BY
HIS ATTORNEY

Fig. 9

| | | | | | | | | | | | |
|---|---|---|---|---|---|---|---|---|---|---|---|
| Square of speed increase of sections when forward speed is increased 10% or from 500 to 550 ft. per second. | 10 | 52500 | 52500 | 52500 | 52500 | 52500 | 52500 | 52500 | 52500 | 52500 | 52500 |
| Square of resultant speeds of sections at 550 ft. per second forward speed. | 9 | 1302500 | 1112500 | 942500 | 792500 | 662500 | 552500 | 462500 | 392500 | 342500 | 312500 | 302500 |
| Square of resultant speeds of sections at 500 ft. per second forward speed. | 8 | 1250000 | 1060000 | 890000 | 740000 | 610000 | 500000 | 410000 | 340000 | 290000 | 260000 | 250000 |
| Increase in helical path angle when forward speed is increased 10% or from 500 ft. to 550 ft. per second. | 7 | 2.25 | 2.30 | 2.50 | 2.65 | 2.70 | 2.70 | 2.60 | 2.40 | 1.90 | 1.00 | .00 |
| Helical path angles in degrees for a forward speed of 550 ft. per second. | 6 | 28.75 | 31.40 | 34.50 | 38.15 | 42.50 | 47.70 | 54.00 | 61.40 | 70.10 | 79.70 | 90.00 |
| Tangents of path angles for a forward speed of 550 ft. per second. | 5 | .550 | .611 | .688 | .787 | .916 | 1.100 | 1.375 | 1.835 | 2.750 | 5.500 | a |
| Helical path angles in degrees for a forward speed of 500 ft. per second. | 4 | 26.5 | 29.1 | 32.0 | 35.5 | 39.8 | 45.0 | 51.4 | 59.0 | 68.2 | 78.7 | 90.0 |
| Tangent of path angles for a forward speed of 500 ft. per second. | 3 | .500 | .556 | .625 | .715 | .833 | 1.000 | 1.250 | 1.666 | 2.500 | 5.000 | a |
| Rotational speeds of blade sections in feet per second. | 2 | 1000 | 900 | 800 | 700 | 600 | 500 | 400 | 300 | 200 | 100 | 0 |
| Sectional locations of blade from center of shaft to tip of blade in % of radius | 1 | 100 | 90 | 80 | 70 | 60 | 50 | 40 | 30 | 20 | 10 | 0 |

INVENTOR
JEAN A. ROCHÉ

BY Richard Van Busum
HIS ATTORNEY

May 7, 1946.  J. A. ROCHÉ  2,399,828
PROPELLER
Filed Oct. 29, 1941  4 Sheets-Sheet 4

Fig. 10

For same propeller as Fig. 9, but at an initial forward speed of 200 ft. per second with a 10% increase.

| 1 | 2 | 3 | 4 | 5 | 6 | 7 |
|---|---|---|---|---|---|---|
| 100 | 1000 | .200 | 11.30 | .2200 | 12.40 | 1.10 |
| 80 | 800 | .250 | 14.00 | .2750 | 15.35 | 1.35 |
| 60 | 600 | .333 | 18.40 | .3665 | 20.10 | 1.70 |
| 50 | 500 | .400 | 21.80 | .4400 | 23.75 | 1.95 |
| 40 | 400 | .500 | 26.55 | .5500 | 28.80 | 2.25 |
| 30 | 300 | .666 | 33.40 | .7330 | 36.25 | 2.75 |
| 20 | 200 | 1.000 | 45.00 | 1.1000 | 47.80 | 2.80 |
| 10 | 100 | 2.000 | 63.40 | 2.2000 | 65.50 | 2.10 |
| 0 | 0 | a | 90.00 | a | 90.00 | .00 |

Fig. 11

For a slow aircraft with a maximum propeller speed of 700 ft. per second at the tip and forward speed of 100 feet per second with a 10% increase.

| 1 | 2 | 3 | 4 | 5 | 6 | 7 | 8 | 9 | 10 |
|---|---|---|---|---|---|---|---|---|---|
| 100 | 700 | .1430 | 8.1 | .157 | 8.9 | .8 | 500000 | 502100 | 2100 |
| 90 | 630 | .1590 | 9.0 | .175 | 9.9 | .9 | 405000 | 407100 | 2100 |
| 80 | 560 | .1785 | 10.1 | .196 | 11.0 | .9 | 322500 | 324600 | 2100 |
| 70 | 490 | .2040 | 11.5 | .224 | 12.6 | 1.1 | 250000 | 252100 | 2100 |
| 60 | 420 | .2380 | 13.4 | .262 | 14.7 | 1.3 | 186000 | 188100 | 2100 |
| 50 | 350 | .2860 | 15.9 | .314 | 17.4 | 1.5 | 132000 | 134100 | 2100 |
| 40 | 280 | .3570 | 19.6 | .393 | 21.4 | 1.8 | 88000 | 90100 | 2100 |
| 30 | 210 | .4760 | 25.5 | .524 | 27.6 | 2.1 | 54000 | 56100 | 2100 |
| 20 | 140 | .7150 | 35.5 | .785 | 38.1 | 2.6 | 29500 | 31600 | 2100 |
| 10 | 70 | 1.4300 | 55.0 | 1.570 | 57.5 | 2.5 | 14900 | 17000 | 2100 |
| 0 | 0 | a | 90.0 | a | 90.0 | .0 | 10000 | 12100 | 2100 |

Fig. 12

INVENTOR
JEAN A. ROCHÉ
BY
Richard Van Buren
HIS ATTORNEY

Patented May 7, 1946

2,399,828

UNITED STATES PATENT OFFICE 2,399,828

PROPELLER

Jean Alfred Roché, Buckroe Beach, Va.

Application October 29, 1941, Serial No. 417,020

4 Claims. (Cl. 170—162)

This invention relates to improvements in aircraft propellers and is particularly directed to such propellers embodying automatic pitch control.

While the propeller art has brought out numerous examples of designs and constructions in which aerodynamic forces were utilized to secure pitch control, none of these examples has, to date, proved satisfactory or practical because the controlling surfaces were not applied with due scientific care. Stress conditions were often compromised, eccentricities were ignored, the weight of the construction itself was not reduced to a minimum, and consequently the bearing frictions, under the tremendous centrifugal offset loads, hindered the operation of pitch changes.

In the design work and experiments conducted in connection with the present invention, it was found that the above-mentioned factors have enormous practical importance and determine whether or not a propeller will operate satisfactorily. It is common knowledge to those experienced in the art, that if some form of direct aerodynamic control for propellers can be made to operate satisfactorily, a most economical type of automatically controllable propeller will be the result.

It is, therefore, necessary to determine, with the utmost practical precision, the angles of tilt and sweepback which will eliminate bending and stresses in the blade and eccentric loads upon the pivot bearings. These angles are of the order of one degree or two degrees for wooden blades, and considerably less for metal blades.

It is absolutely necessary to select pivot bearings which will show the lowest possible friction moments so that they will respond to the smallest variations in aerodynamic moments.

It is also essential to determine the best location and amount of aerodynamic control area necessary to produce the desired pitch changes and at the same time overcome whatever friction is present in the pivot bearings.

It is likewise very important to construct the blades and counterweights as light as possible in order to reduce the overall weight thereof and to minimize the centrifugal loads upon the pivot bearings.

Finally, any increment of area added for the purpose of pitch control must be in a position where the efficiency of the propeller, in converting engine power into thrust, will be reduced as little as possible, or, if possible, increased.

In designing plan forms for blades having self-pitch control, no use has been made in the past of two important facts:

First, the blade sections are subject to largest changes in helical path angles, with respect to changes in forward speed, in the part of the blade near the hubs or spinners;

Second, that there are definite advantages to be gained in increasing the area and chord of propeller blades in the section near the hubs.

The present invention is directed mainly to means for utilizing the discovery and the elaboration of the above facts, and consists of blade plan form designs and constructions adapted to take full advantage thereof without in any way prejudicing the most efficient operation or stress conditions of the major thrust producing part of the blades.

The main object of the invention is to provide aerodynamic surfaces, integral or appended, to the blades of a propeller to cause said blades to rotate about a radial axis when acted upon by changes of velocity of the aircraft being propelled.

A further object of the invention is to locate the aerodynamic surfaces in such a manner as to improve the efficiency of the propeller by decreasing the drag of the portion of the blade adjacent the hub, which has been, in most former propellers, a very inefficient airfoil section.

A further object of the invention is to provide aerodynamic surfaces that will assist in the cooling of an engine mounted immediately to the rear of the propeller, and that will contribute a minimum of additional turbulence in the airflow over the body portion of the aircraft.

Another important object of the invention is to provide the desired aerodynamic control without interfering with the aerodynamic efficiency of the propeller blades.

A further object of the invention is the provision of means to render it unnecessary to incorporate more tilt or sweep-back in the propeller blades, with respect to their pivotal axes, than the amount necessary to produce substantially ideal stress conditions.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Figure 5 also shows the relation of the airstream to the blunt nose of the aircraft and to the plan form of the propeller blade.

Figure 9:
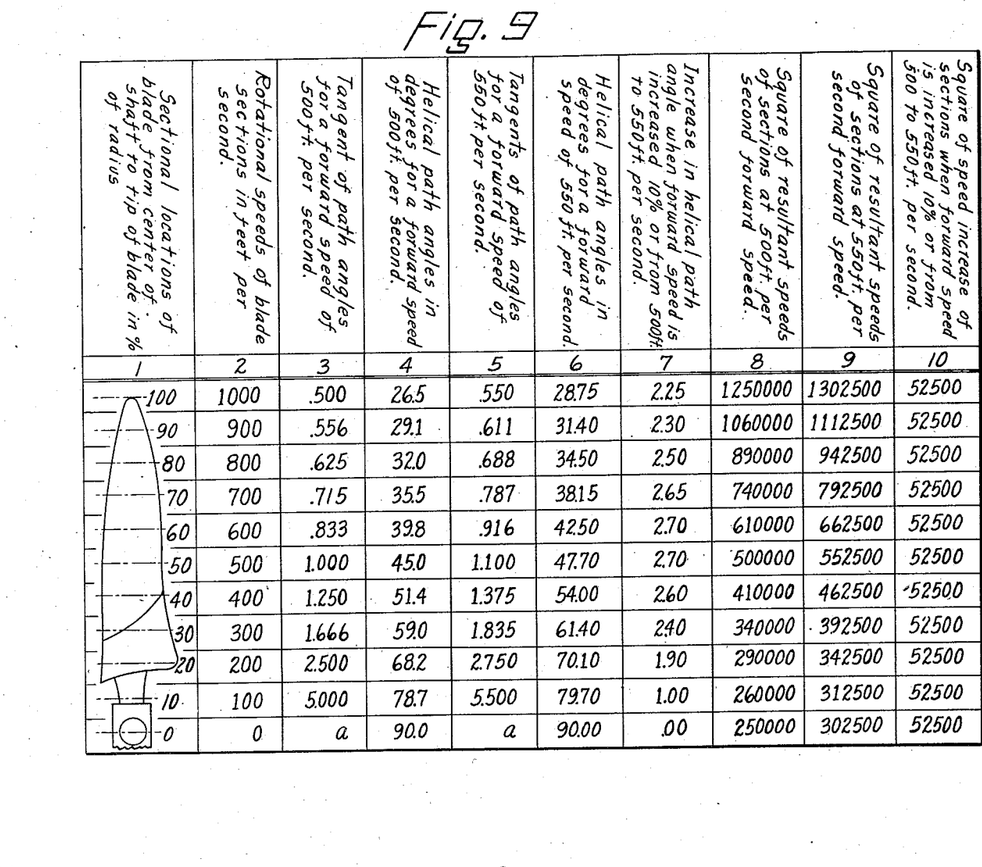
Figure 9 is a table giving the characteristics of a propeller of high pitch when used on a fast aircraft traveling at maximum forward speed.
Figure 10:
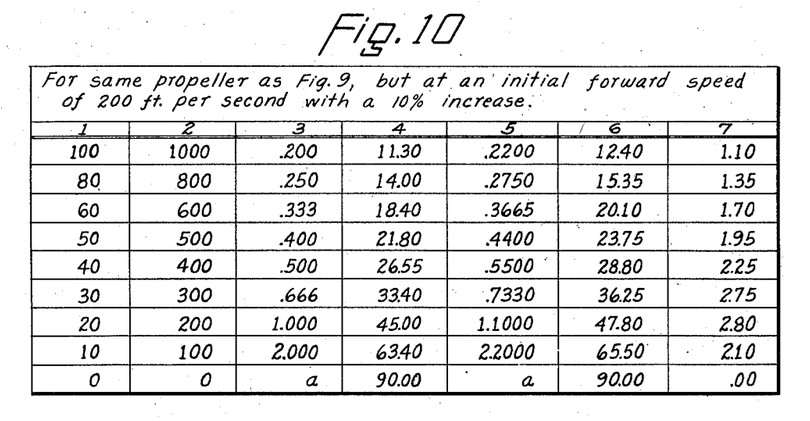
Figure 10 is a table giving the characteristics of the propeller of Figure 9 when the aircraft is traveling at a reduced forward speed.
Figure 11:
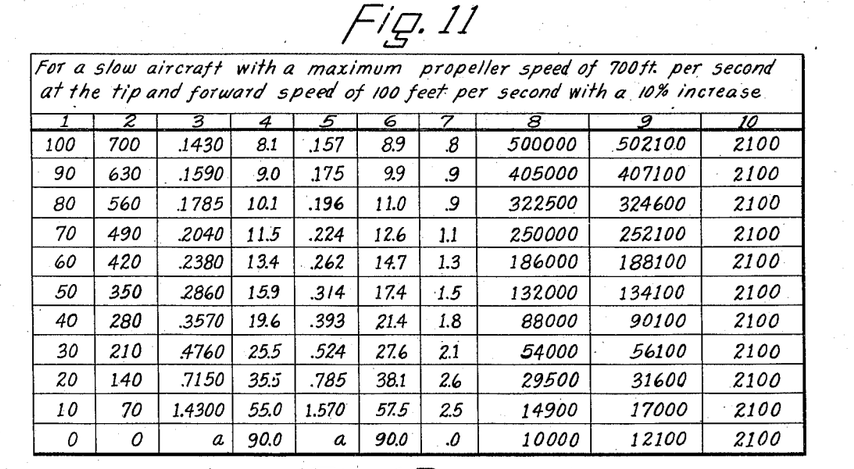
Figure 11 is a table giving the characteristics of a propeller of comparatively low pitch when used on a slow aircraft traveling at cruising speed.

The three tables shown in Figures 9, 10 and 11 are examples illustrating the fact that the greatest changes in helical path angles, for all aircraft propeller blades, with respect to changes in the forward speed of the aircraft, occur at the inboard portions of the blades.

The table of Figure 9 applies to a propeller having a relatively high pitch, such as would be used on a fast airplane equipped with a geared engine, during flight at the maximum or top speed of the airplane.

The table of Figure 10 applies to the propeller of Figure 9 operating at the same rotational speed, but at a slower forward speed of the airplane, as would be the case during a climb or in cruising at low throttle.

The table of Figure 11 applies to a propeller having a relatively low pitch, such as would likely be used on a slow airplane equipped with an ungeared engine. The forward speed used in this example is approximately the cruising speed of the aircraft.

In the table of Figure 9, column 1 gives the location of the sections of a given blade about the center of the propeller, in percent of the radius of the blade.

Column 2 gives the rotational speeds of the different blade sections in feet per second.

Column 3 gives the tangents of the path angles of the blade sections for a forward speed of 500 feet per second, of the aircraft.

Column 4 gives the helical path angles in degrees for a forward speed of 500 feet per second, of the aircraft.

Column 5 gives the tangents of the path angles assuming that the forward speed of the aircraft, is increased 10%, i. e., from 500 to 550 feet per second.

Column 6 gives the helical path angles corresponding to the above 10% increase in forward speed.

Column 7 gives the increment of path angles caused by the 10% increase in forward speed.

Column 8 gives the squares of resultant speeds of the different blade sections when they are moving forward at a speed of 500 feet per second.

Column 9 gives the squares of resultant speeds when the forward movement is 550 feet per second.

Column 10 gives the squares of the speed increment due to the change in forward speed.

In the table of Figure 10, like numbered columns give corresponding quantities which differ in magnitude from the values in Figure 9, because the initial forward speed has been assumed at 200 feet per second, which corresponds approximately to the climbing speed of the same airplane assumed to have a top speed of 500 feet per second in the table of Figure 9. The speed increment for this table is 20 feet per second, or 10% of the forward speed as in the first case.

In the table of Figure 11, like numbered columns give corresponding quantities for a propeller on a slow airplane. The rotational speed at the tip has been assumed at 700 feet per second, the initial forward speed has been assumed at 100 feet per second, and the speed increment at 10 feet per second; again 10% increase, as in the two preceding cases.

Figure 1:
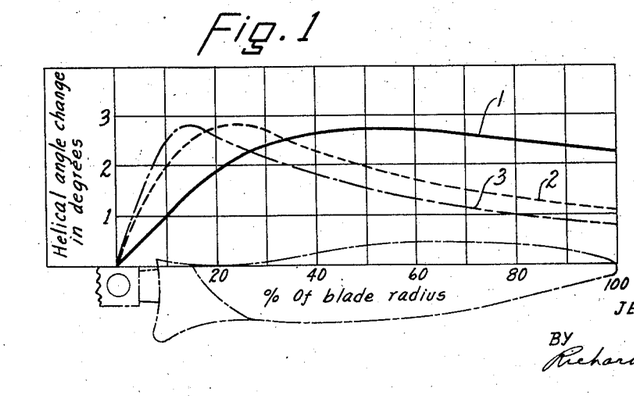
Figure 1 is a graph showing three curves which represent the variations in path angles which occur along the radius of propeller blades when the speed of the propelled aircraft is increased from a certain value to another value 10% higher.

In order to facilitate visualization of the facts deduced from these tables, Figure 1 has been prepared to show graphically the variation of helical angles along the blade radius.

Curve 1 of this figure is a plot of the values of columns 1 and 7 of Figure 9 as abscissas and ordinates, respectively.

Curve 2 of Figure 1 is a similar plot of the values of columns 1 and 7 of Figure 10.

Curve 3 of Figure 1 is a similar plot of the values of columns 1 and 7 of Figure 11.

From examination of the seventh columns of the tables of Figures 9, 10 and 11 and the curves of Figure 1, it is evident that the greatest changes in angle of attack are available well inboard or towards the hub from blade tips, namely between 35% and 75% for the high speed propeller operating in the high speed condition (Fig. 9); between 10% and 50% for the same high speed propeller operating at slower forward speed as in a climb (Fig. 10), and between 8% and 35% for the low speed propeller operating in its average speed condition (Fig. 11).

Examination of the tenth columns of Figures 9 and 11 shows that the increment of velocity squared is the same all along the blade for each propeller and, therefore, that there is no advantage in locating control areas near the tips, even from the standpoint of higher velocities being available at these points. This fact having been demonstrated in Figures 9 and 11, the values of columns 8, 9 and 10 were omitted in Figure 10.

Other factors being equal, the same amount of area and leverage would be needed anywhere along the blade to give a predetermined desired controlling moment. However, the farther from the center of the propeller the control area is placed, the more engine torque will be consumed in driving it through the air with consequent loss of useful thrust power and reduced propulsive efficiency.

However, the control areas should not be placed as close to the center of the propeller as possible, as the tables of Figures 9, 10 and 11 and the curves of Figure 1 show that the change of helical angle diminishes toward the center as well as toward the tips; therefore, taking the entire operating speed range of any aircraft into consideration, it is clear that the best location for the automatic aerodynamic control area is between the inner 20% to 50% portion of the blade radius.

Figure 5:
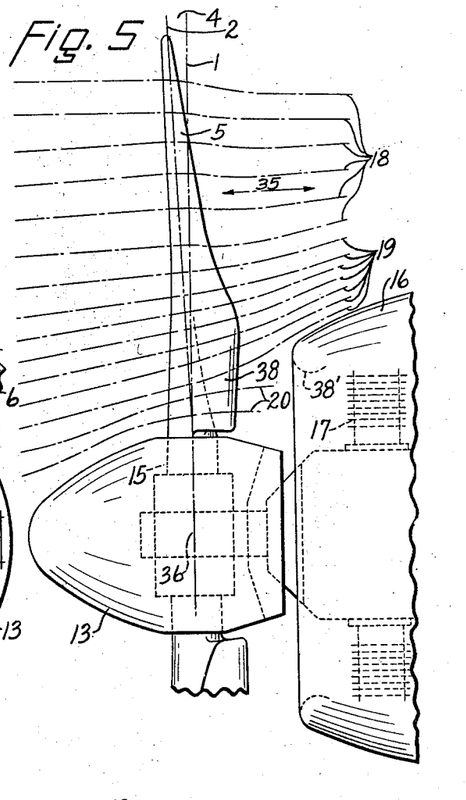
Figure 5 shows a side elevation of the blade of Figure 4 in approximately operating position.

For certain practical reasons, however, such as the presence of the hub, counterweights and spinners, and because of the reduced air flow velocity through the central portion of propellers operating in front of a blunt nosed aircraft, such as shown in Figure 5, the inner 20% of the blade radius is generally covered by a spinner or otherwise rendered useless for aerodynamic propulsion or control, so that the conclusion just stated, on the basis of pure theoretical grounds, could be more practically restated thus: The best location for the aerodynamic control area for a propeller blade is within the inner half of the portion of the blade exposed to the air stream.

Figure 2:
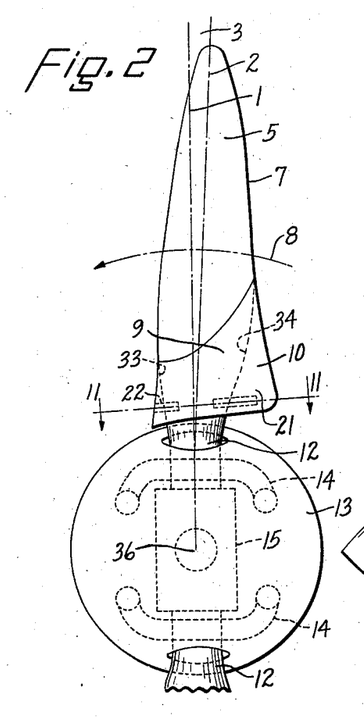
Figure 2 shows a propeller blade plan form in accordance with the present invention, mounted upon an airplane having a pointed nose, such as currently used with modern high speed liquid cooled engines.

Returning now to the definite advantages obtainable by increasing the chord and area of propeller blades in the sections close to hubs and spinners, it must first be recalled that all propellers in current usage, whether built of wood, steel or aluminum alloy, are built with a plan form which gradually decreases or necks down toward the hub, substantially as shown by lines 33 and 34 of Figure 2.

This pattern is justifiable in the case of metal blades because of considerations of strength, weight, economy in manufacture and resistance to vibration.

The disadvantages of poorly streamlined blade sections near the hubs of high speed aircraft is generally realized, and in the past some attempts have been made to improve streamlining of these parts by means of spinners and cuffs. However, such cuffs have not been made wider than the widest section of the blades, which section is generally located half way between the shanks and the tips of said blades, as at section 8 of Figure 2. The plan form areas of such control cuffs have not been disposed well aft of the blade pivot axis, because in the construction of former propellers use has not been made of such areas for automatic pitch control, as applicant is doing in accordance with the present invention.

It is of interest to note that the disc area or plane of rotation swept by the inner 50% of the blade is less than one-fourth of the total disc area and consequently the added loss or saving in power consumption effected in driving any additional area in this portion of the blade will be small. Whether there is a loss or a gain in power will depend upon the care exercised in selecting the section-shape and the pitch-angle to suit local air velocities, as affected by the presence of neighboring bodies.

Some important incentives remain for applying wide fairings to the inner exposed portions of propeller blades apart from considerations of propeller efficiency, namely, to keep the air flow over the succeeding bodies smooth and to avoid turbulence at the center of the propeller disc, which, by interfering with smooth air flow, reduces the cooling efficiency of radiator, radiator ducts and other openings on the body of the aircraft. It is a well known fact that good aerodynamic bodies should have sections about 3½ times as long as they are thick, and that such bodies should operate at sufficiently low angles of attack to promote the least possible turbulence or breakdown of the smooth natural air flow. These desirable form characteristics have been embodied in the construction and shapes disclosed in this invention.

Figure 3:
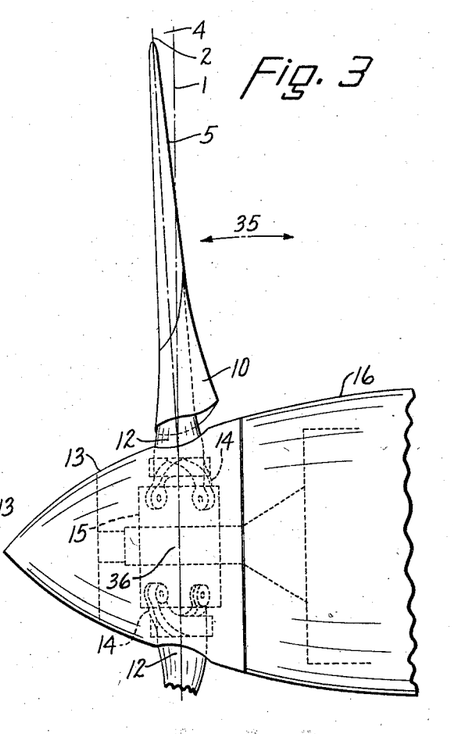
Figure 3 shows the propeller blade of Figure 2 in side elevation, and in operating position.

Referring now to Figures 2 and 3, which show a blade plan form adaptable to the blades of a propeller installed on a pointed body, the following reference numerals represent the following parts and data:

1 represents the pivot axis of the blade.

2 represents the blade axis, which passes approximately through the centers of gravity of the blade sections.

3 represents the angle between axes 1 and 2, in the front elevation, commonly known in the art as angle of sweep-back.

4 represents the angle between axes 1 and 2, in side elevation, known in the art as the angle of tilt.

5 represents the tip portion of the propeller blade.

8 represents the direction of rotation of the propeller.

35 represents the direction of thrust, in which the air is accelerated in passing through the propeller disc.

9 represents the inboard portion of the blade.

10 represents the additional area, located in accordance with the present invention, and, in this case, applied to the blade as a wrapper or cuff.

11 represents a section through the propeller blade affected by the additional cuff area.

12 represents the shank of the blade.

13 represents the spinner or nose portion of the propeller.

14 represents the counterweights attached to the blade shank, said weights being preferably in two complementary sections which are adjustably clamped around the cylindrical root portions of the blades in substantially the same manner as disclosed in Fig. 3 of the United States Patent No. 2,219,303, issued October 29, 1940, to K. G. Fraser.

15 represents the hub in which the blades are pivoted.

36 represents the center of the propeller.

21 and 22 represent parts of clamping blocks riveted to the cuff. These blocks are shown more in detail in Figure 6.

Dash lines 33 and 34 show the usual shape of current propeller blades near the shank, which shape cannot practically be modified to encompass the area 10 without risking fatigue failure when the contour is again abruptly changed to conform to the shank portion 12.

Attention is called to the fact that practically all the area added by the cuff 10 (Figs. 2 and 3) is well aft of the pivot axis of the blade. The very small amount of area added at 22 is only for the purpose of streamlining the blade and has little, if any, effect on the pitch control of said blade. The area 10, aft of the pivot axis, alone is effective in producing the aerodynamic moments which increase and decrease the blade pitch in proper amounts to maintain the engine R. P. M. within the desired limits, and to cause the blade to feather effectively when, for any reason, the engine stops on an airplane in flight.

Furthermore, area 10, located and shaped as it is, has greater leverage and enjoys greater changes of path angle, as the forward speed of the aircraft is increased or decreased, than if it were located nearer the blade tip.

This added area, or cuff 10, combines the advantage of extremely powerful aerodynamic control with that of adequately fairing or shaping of the blade shank or inner portion, this latter improving the air flow over the body of the aircraft beyond the propeller. The blade's propelling efficiency is therefore improved and the stress distribution is not appreciably affected.

Referring now to Figure 3, which is a side elevation of Figure 2, the reference numerals represent the following parts and data:

16 represents a side view of an aircraft having a pointed body.

13 represents the spinner which covers the hub and inner part of the propeller blade shank.

35 indicates the direction of the forward thrust on the blade and backward thrust on the air.

4 represents the angle, as observed from the side, between the blade axis and the blade pivot axis, commonly referred to as the angle of tilt.

In a blade plan form designed in accordance with the present invention, the sweep-back angle 3 (Fig. 2) and the tilt angle 4 (Fig. 3) have such values that the resultant load on the blade, when in operation, passes as nearly as possible along the axis of the blade and through the center of the blade pivot bearings.

The resultant load on the blade is the vector sum of the centrifugal forces acting on the blade, the thrust loads acting forward and normal to the propeller disc, and the torque loads acting in the plane of rotation in a direction opposite to the direction of rotation. The mathematical processes for determining these loads and the most desirable values of tilt and sweep-back angles from the standpoint of best stress conditions in the blade are well known in the art of propeller design and in the past have been applied to eliminate the majority of bending moments in propeller blades, but have not been applied to minimize friction in the bearings which carry the centrifugal load of the blade.

Figure 12:
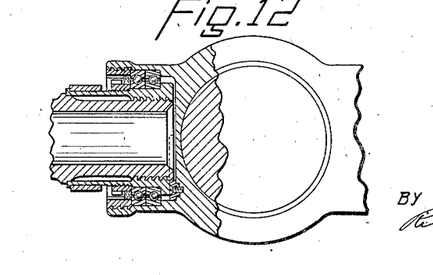
Figure 12 is a detail view showing one method of pivoting the propeller blades in the hubs.

Referring now to Figure 12, anti-friction bearings of the ball type for use in pivotally mounting the blades, under light loads exhibit very little friction, but under very heavy loads, which cause appreciable elastic deflections in the surfaces of the races and of the rolling elements, rolling friction loads reach considerable values which may hinder or even prevent pitch changes in a blade which is actuated by light aerodynamic forces. This also applies to roller type bearings. If, for instance, a blade is so designed that the resultant load of the blade passes through the center of the pivot bearings, then the load will be equally distributed among all the balls or rollers of the bearings and rolling friction will be reduced to a minimum. If, however, the resultant load should be displaced by half the diameter of the bearings, which might not be too detrimental to the stress conditions in the blade, then the entire load would be concentrated on two or three of the balls or rollers, the corresponding elastic deflections would be great and the rolling friction might be several times as great as in the case of equal distribution. In this latter case, in addition to the disadvantage of high rolling friction, brinelling or denting and flaking of races would likely occur.

Figure 4:
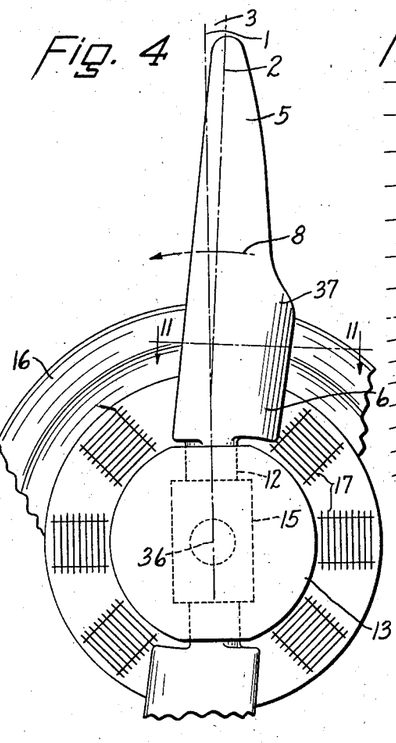
Figure 4 shows another propeller blade plan form in accordance with the present invention installed in front of a blunt nosed airplane, such as used in conjunction with radial air-cooled engines.

Figure 4 shows a blade plan form in accordance with the present invention, but adapted to propeller blades installed on the front end of blunt nosed aircraft bodies of the type used in conjunction with air-cooled radial engines, of which the cylinders are represented by 17. A spinner 13 is shown, although such an element is often omitted from radial air-cooled engine installations. The presence of this spinner element does not materially affect the air flow about this combination of propeller and body, nor does it affect the discussion which follows relative to the plan form of the added area for automatic pitch control.

In Figure 4 the added areas at 37 and 6, which provide respectively the aerodynamic control, and the fairing of the inner portion of the blade, are integral with said blade, which construction is well adapted to blades made of wood or plastic material, which are insensitive to fatigue at sharply reduced sections. In the case of a metal propeller, a cuff constructed in accordance with Figures 2, 6 and 7 should preferably be used.

Figures 6, 8:
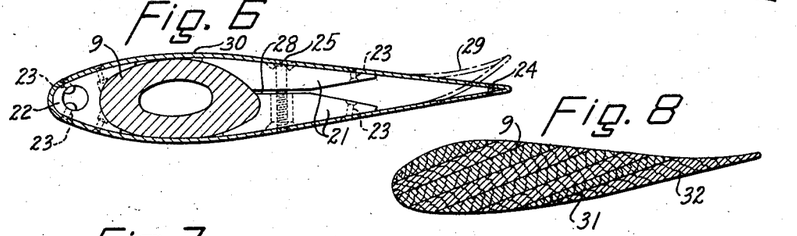
Figures 6 and 7 show types of sectional construction suitable for producing the plan forms in accordance with the invention with the addition of a minimum amount of weight and with a minimum of disturbance to the uniform stressing of propeller blades.
Figure 8 is a section taken along line 11 (Fig. 4) and shows a construction accomplishing the same results stated in connection with Figures 6 and 7, but adapted to use on wooden propellers.

In Figures 4 and 5, as in Figures 2 and 3, the following reference numerals represent the following parts and data:

1 represents the pivot axis of the blade.
2 represents the blade-axis.
3 represents the sweep-back angle.
4 represents the tilt angle.
5 represents the outer portion of the blade of conventional efficient design.
8 represents the direction of rotation.
35 represents the thrust action and reaction.
11 represents a typical section through the added area further described with Figure 8.
15 represents the hub from which counterweights have been omitted as unnecessary to this description.
16 represents the front body cowling typical of that currently used around radial air-cooled engines.

For a detailed explanation of the shape of the added area shown in Figure 4, reference may be made to the air stream depicted in Figure 5, which is a side elevation of the propeller and cowl shown in Figure 4. The stream flow lines are denoted by numbers 18, 19 and 20. These three groups of stream lines are subject to quite different treatment as a result of the passage of the propeller and body therethrough.

In the first group of stream lines, denoted by 18, the air is mainly subject to an acceleration caused by the propeller. The resulting velocity increase causes the stream lines to come closer together, as is always the case in a field of higher velocity. This coming together of the stream lines, concurrent with velocity increase, is well evidenced in the case of flow of fluids through plate orifices or in the case of a fan blowing air, in both cases a vena-contracta is formed quite familiar to students of elementary physics.

The velocity increase and the corresponding crowding of the stream lines in the region 18, which is not too close to the body, depends mainly upon the speed of the airplane and the slip or efficiency of the propeller sections effecting the acceleration of the air.

In the second group of stream lines, denoted by 19, the air is subjected to much less acceleration from the propeller blades because their rotational velocity is much lower at this point than nearer the tips, but the air stream is subjected to a great speeding up and crowding of the stream lines due to the passage of the body as it forces its way through the air. This effect extends to the propeller disc and the air velocity increase over the portion of the added blade area, denoted by numbers 37 and 6, is favorable to the aerodynamic forces and moments desired for pitch control.

Any improvement in blade fairing, resulting from lengthened sections in this region, are also bound to have a favorable effect on the propeller efficiency and the drag of the body.

In the third group of stream lines, denoted by 20, the air moves at relatively much lower velocities because its passage through the engine is very much restricted. This air is very turbulent. Those who specialize in engine cooling research have found that much of this air enters the cowl opening, circulates around the engine cylinders and comes out the cowl opening again, having failed to find an exit opening to go through. Consequently the added area 38 (Fig. 5) will not contribute any large or definite forces and moments for the purpose of pitch control. Nevertheless, the turbulence of the air flow and the radial component may be diminished by well shaped blade fairings, and the cooling of the engine will be definitely improved for a given total size of ring opening diameter at 38'.

The preceding explanation shows that the location and shape of the added area is affected by abstruse considerations of air flow hitherto not well understood and not applied to the design of propeller blades; particularly not to the class of blades which rely for their pitch control on changes in their own aerodynamic moments resulting from changes in forward speed of the aircraft.

Figure 6 shows a practical construction for a blade root cuff especially suitable for a metal propeller blade and corresponds to the section 11—11 through the blade of Figure 2.

In Figure 6 the following reference numbers represent the following parts and data:

9 represents the blade which may be solid or hollow.

22 represents a forming block at the leading edge of the cuff.

21 represents forming blocks at the mid-portion of the cuff. These blocks are separated by a gap 28, which insures a firm grip on the blade when screw 25 is tightened in nipple 26.

Cuff covering 30 is made of sheet metal of suitable strength and thickness and is attached to blocks 21 and 22 by rivets 23 and by the depressed portions under the heads of screw 25 and nipple 26.

The riveting at the front block 22 requires that clearance holes be provided to make room for the rivet heads.

The trailing edges of the cuff, which may be symmetrical or reflexed, as shown in dotted lines at 29, are riveted together by rivets 24.

The cuff 10 may be secured to the root of the blade by any suitable tension means and in any suitable manner which will not weaken the blade. Such securing means are well known in the art and further description is believed unnecessary.

Figure 7:
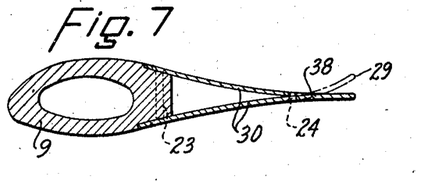

Figure 7 shows an alternate cuff construction suited to metal or wood blades. In this construction the cuff surface 30 is riveted directly to the blade root 9, by rivets 23. The upper cuff element is terminated in a thin edge at 38 and attached to the lower element by rivets 24.

The lower cuff sheet extends aft beyond the end of the upper element and provides a ductile and resilient portion 29 which may be easily adjusted to vary the aerodynamic forces and moments, within ample limits, to effect desired changes in the characteristics of the blade pitch control.

Figure 8 shows the simplest form of installation of additional blade area; that is, the integral form applicable to metal or wood or any of the new plastic materials. In this form the trailing portion 32 may still be adjustable within certain limits, if the material is sufficiently thin and ductile.

In an integral wood construction, it is desirable to have the last lamination 32 (Fig. 8) glued to the blade block on a long sloping line 31, the last lamination 32 having its grain running normal to the blade axis instead of parallel with it, as commonly done. Wood being stronger in the direction of the grain, to carry moments, would thus be disposed so that thinner and lighter sections may be used without fear of splitting along the grain direction.

The reflexing or bending forward with respect to the direction of travel of the aircraft, of the trailing edge of the enlarged pitch control portion of the blade is necessary to obtain the proper stabilization and pitch-changing action of said blade.

In order to function without hunting, a propeller blade, just as any other airfoil, must be made stable in the range of angles of attack in which operation is desired. Airfoils of the simple cambered type are unstable when pivoted about points well aft of their leading edges, and when operating at angles of attack which give a high ratio of lift to drag. Such airfoils may be stabilized in only two known ways: first, by placing the pivot point well forward with respect to the blade section, or by the addition of trailing surface reflexed upward. The degree of stability and the range of angles in which such stability obtains may be adjusted by varying the amount of reflex-curvature and the area affected thereby. It follows that such reflexing is a convenient and often indispensable expedient in adjusting the angle of attack and in securing stable action of any airfoil which is not mechanically constrained.

While there is substantial novelty in the constructions here shown for adding control areas to propeller blades in the best locations for pitch control, still the important part of the invention lies in the plan form of the blade as a whole, with particular emphasis on the feature of applying the additional areas for pitch control at the inner half of the exposed part of the blades.

*Operation*

A brief statement of operation of the propeller of this invention is as follows:

Assuming that the propeller is connected to the engine of an aircraft of modern and efficient design—

As soon as the engine begins to rotate the propeller, the centrifugal moments acting upon the blades and the counterweights equilibrate themselves against the aerodynamic moments acting upon the blades at a predetermined value of pitch, which is established automatically, and produces the desired torque load upon the engine and causes it to turn at the predetermined R. P. M.

As the forward speed of the aircraft increases, the blades describe a helix of increasing pitch and the angle of attack at which the blade sections meet the air tends to decrease. This decrease of angle of attack brings air forces to act upon the reflexed added areas which cause the blades to pivot in the direction of increasing pitch.

If this pitch increase, which results from the velocity increase of the craft as a whole, were allowed to go unchecked, the engine would soon be overloaded and the R. P. M. and H. P. available would drop. However, the centrifugal moments acting upon the counterweights and the blades oppose any excessive increase in pitch. If the weight and position of the counterweights, the size and shape of the added areas, and the degree of the reflexing of said areas, are all properly predetermined, by computations or experimental adjustments, in relation to the potential performance of the aircraft, an automatic control of pitch will result, which will be satisfactory in every respect.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a propeller for an aircraft, the combination of a hub; a plurality of blades pivotally supported by said hub for free movement with relation to each other about axes extending lengthwise thereof, said blades having airfoil portions and substantially cylindrical root portions for pivotally mounting said blades in the hub; a pitch-control element formed on each of the blades and disposed substantially within the inner twenty to fifty per cent. portions of the radius of said blades, said pitch-control elements being of airfoil contour and substantially wider in plan form than the remainder of the airfoil portions of said blades, said width extending aft of the pivotal axes of the blades so as to form enlargements on the trailing edges thereof, the profiles of the backs of the trailing edges of said enlargements being incurved or concave with respect to the flow of the airstream, so as to efficiently utilize the pressure of said airstream to rotate the blades on their pivotal axes to increase the pitch thereof as the pressure of the airstream increases and to decrease the pitch as the pressure of the airstream decreases to maintain the rotational speed of the propeller at a substantially constant value; and a counterweight mounted on the cylindrical portion of each blade near the hub, said counterweights each consisting of a mass disposed so as to act as a radial lever arm on the pivotal axis of its corresponding blade, said counterweights being adjustable about the pivotal axis of the corresponding blade to provide any necessary centrifugal moments to oppose the centrifugal moments of the corresponding blade, thereby acting to check or stabilize the aerodynamic pitch-changing moments of the corresponding blade and thus functioning to retain said blade in any position of pitch adjustment, but still permitting the pitch of the blade to vary a predetermined extent under influence of the pressure of the airstream created by the forward speed of the aircraft and acting upon the enlarged pitch-control element.

2. In a propeller for an aircraft, the combination of a hub; a blade mounted in the hub for pitch-adjusting movement about a pivotal axis parallel to the plane of rotation of said blade, said blade being of airfoil contour throughout the major portion of its length and having its gravity axis inclined forwardly with respect to the plane of rotation of the pivotal axis, and having its gravity axis inclined to lag the pivotal axis with respect to the direction of rotation of the propeller, to counteract bending moments in the blade and to minimize friction in the pivot bearing for the blade, the inner or root end portion of said blade being substantially cylindrical for proper connection to the hub, the inner end of the airfoil portion of said blade exposed to the airstream being substantially wider in a direction aft of the pivotal axis thereof than the remainder of the airfoil portion of said blade, to form a pitch-control area, the trailing edge of said wider pitch-control area being formed or curved forwardly with respect to the flow of the airstream, to efficiently utilize the pressure of said airstream to rotate the blade about its pivotal axis to increase the pitch when the forward speed of the aircraft increases and to decrease the pitch when the forward speed decreases to maintain the revolution of the propeller at a substantially constant value; and a counterweight mounted on the cylindrical portion of the blade adjacent the hub, said counterweight being adjustable about the pivotal axis of the blade to provide centrifugal moments which oppose the centrifugal moments due to the blade's mass and position relative to the pivotal axis, to counteract the effect of any unbalanced forces and to stabilize the pitch-changing movement of the blade and assist in retaining said blade in any position of pitch adjustment throughout its operating range.

3. In a propeller for an aircraft, said aircraft having an operating engine including a drive shaft, the combination of a hub connected to the drive shaft; a plurality of propeller blades of conventional efficient airfoil contour; means to mount the blades in the hub for pivotal movement about axes normal or perpendicular to the axis of the drive shaft, said blades each having its gravity axis inclined forwardly with respect to the plane of rotation of its pivotal axis, and having its gravity axis inclined to lag its pivotal axis with respect to the direction of rotation of the propeller, to counteract bending moments in the blades and to minimize friction in the pivot bearings for said blades; a cuff element removably attached to and surrounding each of the blades at the extreme inner ends of the airfoil portions thereof, said cuffs each forming an airfoil portion which is substantially wider in section than the airfoil portion of the corresponding blade, said width extending aft of the trailing edge of said blade and opposite to the direction of rotation thereof, the trailing edge of each of said cuffs being reflexed or bent forwardly with respect to the direction of travel of the aircraft, so as to efficiently utilize the pressure of the airstream to rotate the blades on their pivotal axes to increase the pitch thereof as the forward speed of the aircraft increases and to decrease the pitch as the forward speed decreases, to maintain the rotational speed of the propeller at a substantially constant value; and a counterweight mounted on each blade near the hub, said counterweights being adjustable about the pivotal axis of the corresponding blade to provide centrifugal moments which oppose the centrifugal moments due to the blade's mass and position relative to its pivotal axis, to assist in retaining said blades in any position of pitch adjustment throughout their operating range, but still permitting said blades to automatically change their pitch in response to the pressure of the airstream acting upon the enlarged and reflexed surfaces of the corresponding cuff elements.

4. In a propeller for an aircraft, the combination of a hub; a blade mounted in the hub for pivotal pitch-adjusting movement about an axis parallel to the plane of rotation of said blade, said blade being of airfoil contour throughout the major portion of its length and having its gravity axis inclined forwardly with respect to the plane of rotation of its pivotal axis, and having its gravity axis inclined to lag its pivotal axis with respect to the direction of rotation of the propeller, to counteract bending moments in the blade and to minimize friction in the pivot bearings for the blade, the inner or root end portion of said blade being substantially cylindrical; a cuff-shaped airfoil element removably secured around the inner end of the blade, said element being of airfoil contour throughout its length, the outer end of said element merging into the contour of the blade and the trailing edge of said element gradually increasing in width from the outer end to the inner end thereof, to form an enlarged pitch-control area, said trailing edge of the element being reflexed or bent forwardly with respect to the flow of the airstream, to efficiently utilize the pressure of said airstream to rotate the blade about its pivotal axis to increase the pitch thereof as the forward speed of the aircraft increases and to decrease the pitch as the forward speed decreases, to maintain the rotational speed of the propeller at a substantially constant value; and a counterweight mounted on the cylindrical portion of the blade near the hub, and consisting of a mass disposed so as to act as a radial lever arm on the pivotal axis of the blade, said counterweight being adjustable about the pivotal axis of the blade to provide any required centrifugal moments to oppose and counteract the centrifugal moments due to the blade's own mass and position relative to the pivotal axis, the combined centrifugal moments of the counterweight and the blade's own mass tending to stabilize and maintain said blade in any position of pitch adjustment throughout its operating range without interfering in any way with the pitch-adjusting movement of said blade in response to the pressure of the airstream acting upon the enlarged and reflexed surfaces of the cuff-shaped airfoil element.

JEAN ALFRED ROCHÉ.